United States Patent [19]

Hensley

[11] Patent Number: 4,462,419
[45] Date of Patent: Jul. 31, 1984

[54] THERMAL BLOCKED VALVE

[75] Inventor: Steve L. Hensley, Columbus, Ohio

[73] Assignee: CVI Incorporated, Columbus, Ohio

[21] Appl. No.: 378,545

[22] Filed: May 17, 1982

[51] Int. Cl.³ .............................................. F16K 49/00
[52] U.S. Cl. ...................................... 137/340; 62/55; 62/383; 62/514 R
[58] Field of Search ............... 137/340, 338, 468, 334; 62/383, 514 R, 64, 55

[56] References Cited

U.S. PATENT DOCUMENTS

| 2,845,306 | 7/1958 | Carver | 137/338 |
| 2,959,023 | 11/1960 | Webster | 62/64 |
| 3,266,517 | 8/1966 | Carr | 137/340 |
| 3,372,556 | 3/1968 | Waldman | 62/514 R |
| 3,491,789 | 1/1970 | Callahan, Jr. et al. | 137/340 |
| 3,884,259 | 5/1975 | Hosmer et al. | 137/375 |

Primary Examiner—Martin P. Schwadron
Assistant Examiner—Sheri Novack
Attorney, Agent, or Firm—Seidel, Gonda & Goldhammer

[57] ABSTRACT

A valve housing is cooled to minimize any temperature gain by the fluid being controlled. The valve member is moved by an actuator toward and away from a seat to control flow through the housing. The valve member and its stem are made from a heat conductive material. The valve member and its stem are cooled by conduction when the valve member is in an open or closed position.

10 Claims, 4 Drawing Figures

THERMAL BLOCKED VALVE

BACKGROUND

In many systems, there is a need for a valve constructed to have a thermal block to minimize any temperature gain by the fluid as it passes through the valve housing. For example, substantial energy is expended to produce liquid helium. Such energy will be partially dissipated if the liquified helium gains in temperature as it passes through a valve.

The present invention is directed to a solution of the problem of how to structurally interrelate the components of the valve so that the valve is thermally blocked.

SUMMARY OF THE INVENTION

The present invention is directed to a valve which is thermally blocked. The valve includes a valve housing having an inlet and an outlet together with a valve seat in the housing. A valve member is positioned in the housing for cooperation with the seat to control flow between the inlet and the outlet. An actuator is coupled to the valve member for moving the value member between an open position and a closed position. A means is provided on the housing for cooling the housing in all positions of the valve member and for optimal cooling the valve member by conduction when the valve member is in an open position.

It is an object of the present invention to provide a thermally blocked valve which is simple, inexpensive and reliable.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
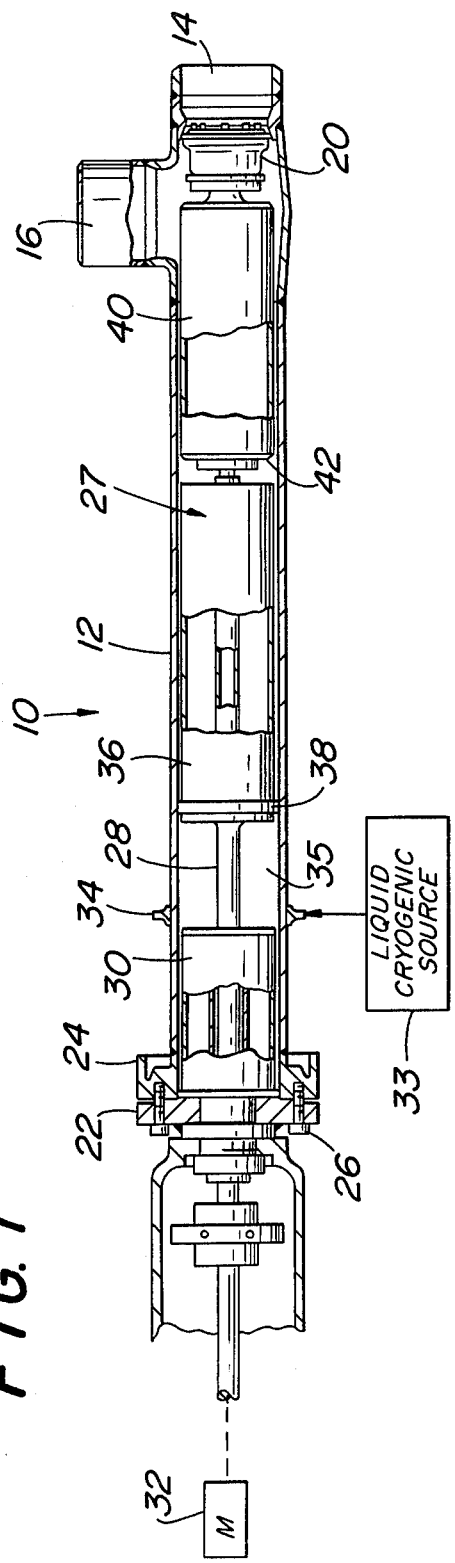
FIG. 1 is a vertical sectional view of the valve of the present invention showing the valve member closed.

Referring to the drawings in detail, wherein like numerals indicate like elements, there is shown a valve in accordance with the present invention designated generally as 10. For purposes of this disclosure, the preferred embodiment involves a valve for use with cryogenics such as liquid helium and wherein the valve is thermally blocked so as to minimize heat gain by the fluid whereby the fluid never sees ambient temperature. The valve of the preferred embodiment to be described hereinafter is designed only for use in a vacuum enclosed system.

The valve 10 includes a housing 12 which is preferably in the form of a cylindrical tube provided with an inlet 14 and outlet 16 at one end. A vacuum jacket for housing 12 is not shown. As illustrated, the outlet 16 is 90° with respect to the longitudinal axis of a tubular portion of housing 12. The arrangement of the inlet and outlet may vary as desired. Within the housing 12, there is provided a valve seat 18. A valve member 20 is provided in the housing, in a manner to be described in greater detail hereinafter, for movement toward and away from the seat 18 for the purpose of controlling flow between the inlet 14 and the outlet 16. At the end of the housing 12 opposite from the inlet 14, there is provided a bonnet flange 24 on the housing 12. Bonnet flange 24 is bolted or otherwise secured to a bonnet 22 by means of bolts 26.

The valve member 20 is moved toward and away from the seat 18 by a valve stem assembly 27. The assembly 27 includes a rod 28 which extends through the bonnet 22 and a hollow cylindrical plug 30. Cylindrical plug 30 is fixedly secured at one end to the flange 24. One end of the rod 28 is connected to an actuator such as motor 32 which may be a hydraulic motor, pneumatic motor, or other comparable device for reciprocating the rod 28 along its longitudinal axis.

Adjacent the free end of plug 30, the housing 12 on its outer periphery is provided with a heat station preferably in the form of copper ring 34 surrounded by and attached to a cryogenic source 33. Source 33 is preferably a separate source. The ring 34 is at the same temperature or slightly higher temperature than the fluid to be controlled.

Figure 2:
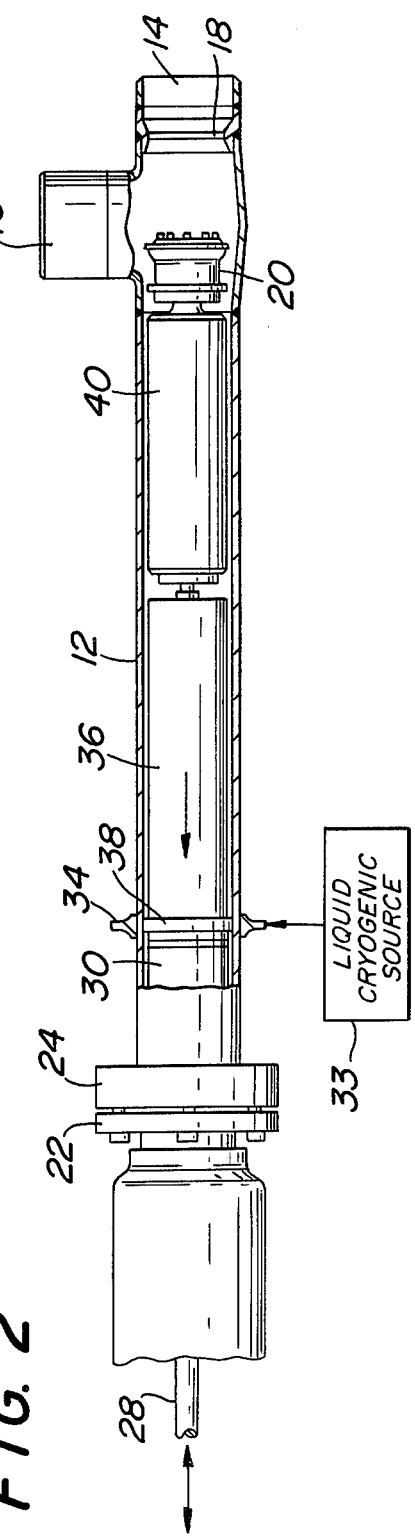
FIG. 2 is a view similar to FIG. 1 but showing the valve member open.
Figure 4:
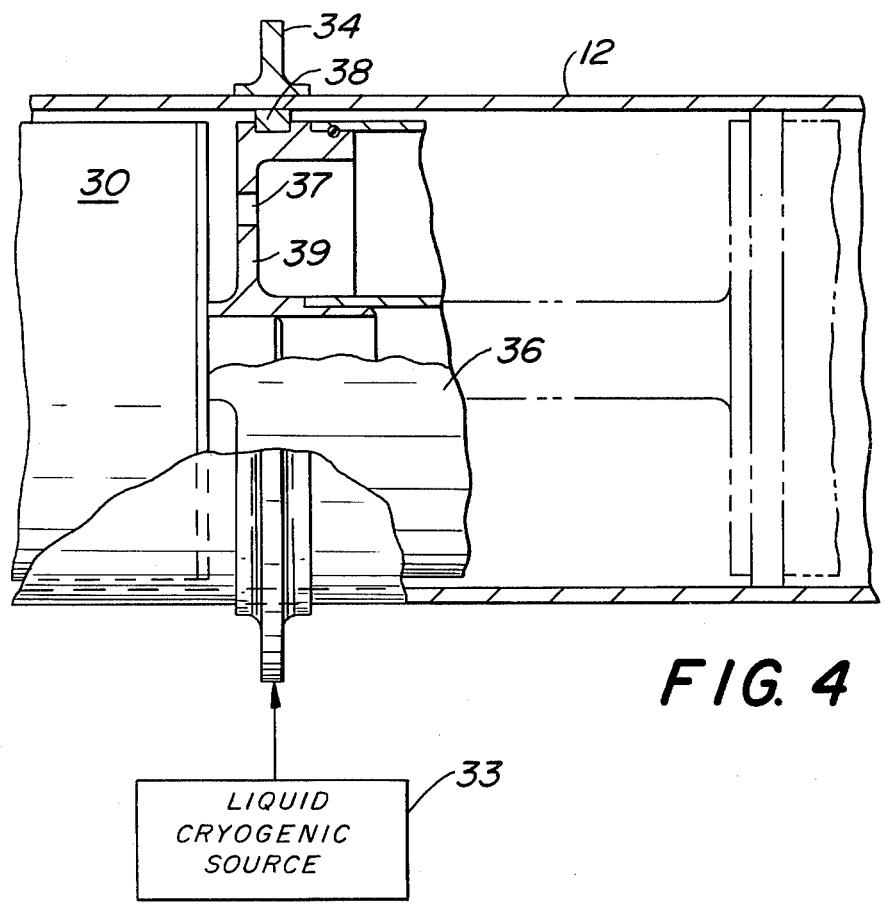
FIG. 4 is an enlarged detail view of a portion of the actuator assembly in the open position of the valve member.

The assembly 27 includes a first spacer 36 having holes 37 in an end wall 39 which is fixedly secured to one end of the rod 28. The end wall 39 of spacer 36 has a thermal block ring 38 on its outer periphery. Ring 38 is in contact with the inner peripheral surface of the housing 12 and preferably is a ring of berylco or like conductive material. Ring 38 is located on spacer 36 so as to be opposite ring 34 in the open position of the valve member 20 as shown in FIG. 4. In order that air in chamber 35 is not compressed when assembly 27 is stroked to the position shown in FIG. 2, chamber 35 is vented in any desired manner such as by notching ring 38.

Figure 3:
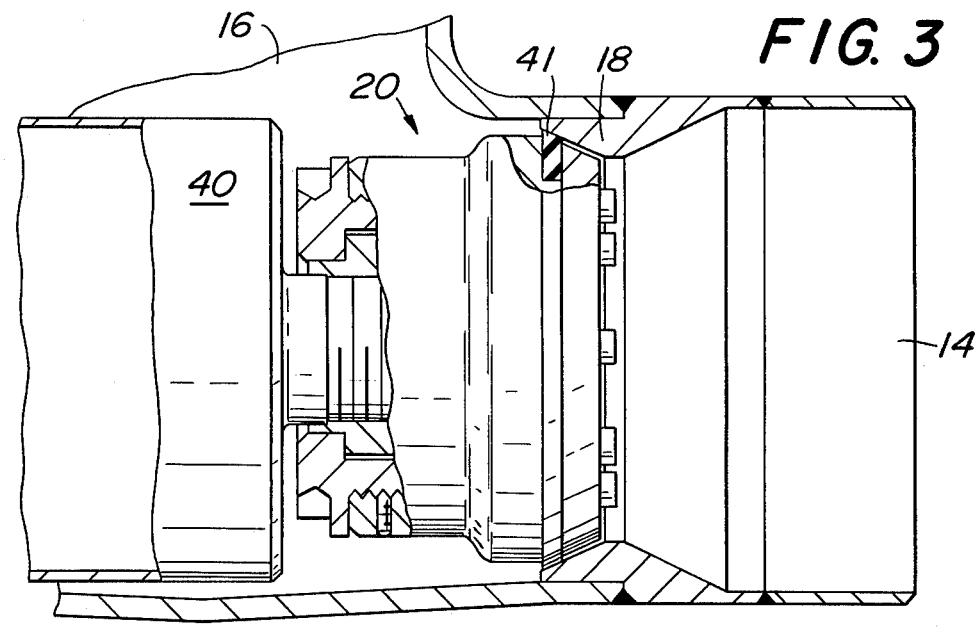
FIG. 3 is an enlarged detail view of the valve seat and valve member.

The end wall of the spacer 36 remote from end wall 39 is removably connected to end wall 42 of barrel 40 in any convenient manner such as by means of a bayonet slot or T slot. The other end of barrel 40 is threadly connected to the valve member 20. See FIG. 3. Valve member 20 may include a resilient seal 41 which contacts seat 18. End wall 42 of barrel 40 does not have holes corresponding to holes 37. Except for the sealing ring 38, the outer diameter of spacer 36 and barrel 40 has a clearance of about 0.003 to 0.005 inches with respect to the inner peripheral surface of the housing 12 to define a gas trap.

The housing 12 and the valve assembly 27 are made from a heat conductive material so that the fluid being controlled never sees a temperature warmer than its own temperature. A separate source of a cryogenic fluid such as liquid nitrogen, gaseous helium or the like may be coupled to the ring 34. In the open position of the valve member 20, each of the housing 12 and valve stem assembly 27 are cooled. In the closed position of the valve member 20, the housing 12 is cooled and a partial cooling benefit is gained by assembly 27.

The present invention may be embodied in other specific forms without departing from the spirit or essential attributes thereof and, accordingly, reference should be made to the appended claims, rather than to the foregoing specification, as indicating the scope of the invention.

I claim:

1. A valve for controlling cryogenic fluids in a vacuum enclosed system and having a thermal block comprising a hollow valve housing having an inlet and an outlet, a valve seat in said housing, a valve member positioned in said housing for cooperation with said seat to control flow between the inlet and outlet, means including a stem coupled to said valve member for moving said valve member between an open and closed position, an external source of refrigeration connected to means on the housing for cooling said housing in all positions of said valve member and for cooling said valve member by conduction via said stem when said valve member is in an open position.

2. A valve in accordance with claim 1 wherein said cooling means includes a ring of good heat conductive material attached to the outer periphery of said valve body, a ring of good heat conducting material contacting the inner periphery of said housing and attached to said stem, said rings being directly opposite one another in the open position of said valve member.

3. A valve in accordance with claim 2 wherein said stem includes a plurality of hollow cylindrical members coupled together in alignment and spaced from the inner periphery of a cylindrical portion of said housing to form a gas trap, one of said members being connected to the valve member, the other of said members having said last-mentioned ring thereon and in contact with the inner periphery of said housing.

4. A valve for controlling flow of a cryogenic fluid while being disposed within a vacuum comprising a hollow valve housing which is cylindrical along a major portion of its length, said housing having an inlet and an outlet at one end thereof, a valve seat in said housing adjacent said inlet, a valve member positioned in said housing for cooperation with said seat to control flow between the inlet and outlet, a stem of a heat conductive material coupled to said valve member for reciprocating said valve member between an open and closed position, a motor connected to said stem, and a refrigeration source connected to means on the housing for cooling said housing in all positions of said valve member and for cooling each of said stem and valve member by conduction when said valve member is in an open position.

5. A valve in accordance with claim 4 wherein said stem includes a rod connected to one end of a cylindrical spacer, said housing having a bonnet flange at one end thereof, a cylindrical plug connected to said flange and projecting into said housing, said rod extending through said plug, said stem including a cylindrical spacer movable toward and away from said plug.

6. A valve in accordance with claim 4 wherein said means includes a ring of good heat conductive material attached to the outer periphery of said valve body, a ring of good heat conducting material within said housing and attached to said stem, said rings being directly opposite one another only in the open position of said valve member.

7. A valve in accordance with claim 6 wherein said stem includes a hollow cylindrical barrel and spacer coupled together in alignment and spaced from the inner periphery of said cylindrical portion of said housing, said spacer being connected to the valve member, another of said spacers having said last-mentioned ring thereon and in contact with the inner periphery of said housing.

8. A valve in accordance with claim 4 wherein said source includes a source of cryogenic fluid in heat exchange relation with said housing.

9. A valve for use in a vacuum enclosed system controlling flow of cold fluids comprising a valve housing having an inlet and an outlet, a valve member movably positioned in said housing to control flow between the inlet and outlet, means coupled to said valve member for moving said valve member between an open position and a closed position, means for minimizing transfer of heat from the valve body and valve member to cold fluid flowing from said inlet to said outlet when said valve member is in its open position, said means including an external source of refrigeration at a cryogenic temperature connected to said housing for cooling said housing in all positions of said valve member and for also cooling said valve member only when the valve member is in its open position.

10. A valve in accordance with claim 9 wherein said means for moving said valve member includes a stem, said source being connected to a discrete portion of said housing, a ring of good thermal conductive material supported by said stem, said ring being in contact with said portion of the housing only when the valve member is in its open position.

* * * * *